United States Patent [19]  [11] 3,929,912
Hervert  [45] Dec. 30, 1975

[54] ALKYLATION OF HYDROXY-SUBSTITUTED AROMATIC COMPOUNDS

[75] Inventor: George L. Hervert, Woodstock, Ill.

[73] Assignee: Universal Oil Products Company, Des Plaines, Ill.

[22] Filed: Dec. 22, 1972

[21] Appl. No.: 317,871

Related U.S. Application Data

[63] Continuation-in-part of Ser. No. 40,454, May 25, 1970, abandoned, which is a continuation-in-part of Ser. No. 686,690, Nov. 29, 1967, abandoned.

[52] U.S. Cl............ 260/624 C; 260/609 D; 260/625
[51] Int. Cl.²......................................... C07C 39/06
[58] Field of Search ........ 260/624 R, 624 C, 671 C, 260/619 R, 671, 621 R, 609 R, 609, 609 D, 625

[56] References Cited
UNITED STATES PATENTS

| | | | |
|---|---|---|---|
| 2,275,312 | 3/1942 | Tinkler | 260/624 C |
| 2,423,470 | 7/1947 | Simons | 260/677 |
| 3,076,848 | 2/1963 | Laufer | 260/609 |
| 3,349,144 | 10/1967 | Aluli et al. | 260/671 |

*Primary Examiner*—Bernard Helfin
*Assistant Examiner*—W. B. Lone
*Attorney, Agent, or Firm*—James R. Hoatson, Jr.; Raymond H. Nelson; William H. Page, II

[57] ABSTRACT

The alkylation of hydroxy-substituted aromatic hydrocarbons is effected in the presence of a novel catalyst comprising a hydrogen fluoride-carbon dioxide complex to prepare alkylated hydroxy-substituted aromatic compounds.

6 Claims, No Drawings

ALKYLATION OF HYDROXY-SUBSTITUTED AROMATIC COMPOUNDS

CROSS REFERENCE TO RELATED APPLICATIONS

This application is a continuation-in-part of my co-pending and now abandoned application Ser. No. 40,454, filed May 25, 1970 which was a continuation-in-part of co-pending application Ser. No. 686,690, filed Nov. 29, 1967 and now abandoned.

This invention relates to a process for the alkylation of organic compounds, and particularly, hydroxy-substituted aromatic compounds, in the presence of certain catalytic compositions of matter. More particularly, the invention is concerned with the use of novel catalytic compositions of matter comprising a hydrogen fluoride-carbon dioxide complex to effect the alkylation of certain compounds whereby a desirable product is obtained.

Heretofore, it has been known to utilize acidic catalysts to effect certain reactions involving organic compounds such as hydrocarbons or substituted hydrocarbons. These acidic catalysts which have been used in the prior art include sulfuric acid, hydrogen fluoride, etc. However, when utilizing these catalysts only limited yields of the more desirable products are obtained. In order to increase the yield of the desirable products, it is necessary to modify the catalyst system.

Certain alkylated hydroxy-substituted aromatic compounds constitute useful compounds in the chemical industry. For example, isopropylphenol is useful as an intermediate in the preparation of synthettic resins, plasticizers, surface-active agents, perfumes, etc.; likewise, the t-butylphenols are useful also as chemical intermediates for synthetic resins, plasticizers, surface-active agents, perfumes, antioxidants or as plasticizers for cellulose acetate, pour-point depressors and emulsion breakers for petroleum oils, as insecticides, industrial odorants, etc. The t-butyl-m-cresols are useful as germicides, disinfectants, additives to lubricating oils, in perfumes as a fixative, in synthetic resins, etc. Dodecylphenol which may be prepared by the process of this invention is useful as a solvent, as an intermediate for surface-active agents, or may be used in the preparation of oil additives, resins, fungicides, bactericides, dyes, pharmaceuticals, adhesives, rubber chemicals, etc.

It is therefore an object of this invention to provide a process for effecting certain organic reactions in the presence of a novel catalyst system.

A further object of this invention is to provide a process for effecting certain organic reactions such as the alkylation of hydroxy-substituted aromatic compounds in the presence of a novel catalyst system comprising a hydrogen fluoride-carbon dioxide complex.

In one aspect an embodiment of this invention resides in a process for the liquid phase alkylation of a hydroxy-substituted aromatic compound by condensing said compound with an alkylating agent in the presence of an alkylation catalyst at a temperature in the range of from about $-20°$ to about $150°$ C. and a pressure in the range of from about 10 to about 2,000 pounds per square inch, said aromatic compound being selected from the group consisting of phenol, polyhydric phenols, monoalkyl mono-hydric phenols, polyalkyl mono-hydric phenols, thiophenol and monoalkyl thiophenols, and said alkylating agent being selected from the group consisting of olefins and low molecular weight carbohydrates, the improvement which comprises utilizing as said catalyst a hydrogen fluoride-carbon dioxide complex consisting essentially of carbon dioxide and from about 0.1 to about 95 weight percent hydrogen fluoride.

A specific embodiment of this invention is found in the process for the alkylation of phenol which comprises condensing said phenol with propylene in the presence of a catalyst comprising hydrogen fluoride-carbon dioxide complex containing from about 0.1 to about 95 weight percent hydrogen fluoride at a temperature in the range of from $-20°$ to about $150°$ C. and at a pressure in the range of from 10 to about 2,000 pounds per square inch, and recovering the resultant isopropylphenol.

Other objects and embodiments will be found in the following further detailed description of the present invention.

As hereinbefore set forth, the present invention is concerned with the process for effecting the alkylation of hydroxy-substituted compounds in the presence of a catalyst comprising a hydrogen fluoride-carbon dioxide complex. By utilizing the catalyst complex of the present invention, it is possible to modify the alkylation of these compounds in order to obtain a preferred product distribution. In addition, it is possible to effect the alkylation of aromatic hydrocarbons utilizing a lesser amount of the catalyst, thereby effecting corresponding decrease in the overall cost of the operation. In addition to utilizing a lower inventory of hydrogen fluoride, it is also possible, by utilizing the catalyst complex of the present invention, to obtain an increased solubility of the reactants along with increased acidity of the reaction. This will lead in many instances to an isomerization reaction whereby the more desired isomers of the product are obtained. Furthermore, by utilizing the catalytic compounds of the present invention, it will be possible to obtain more primary alkylation reactions with the corresponding decrease in secondary and tertiary alkylation. This will, of course, be preferred when the desired product comprises a mono-alkylated hydroxy-substituted aromatic compound rather than di- or polyalkylated products.

While the aforementioned discussion has been centered about an alkylation reaction, it is also contemplated within the scope of this invention that the hydrogen fluoride-carbon dioxide complex may also be used to effect other organic reactions such as isomerization, whereby the double bond arrangement of a particular olefinic compound will be altered, i.e., a shifting of a double bond toward a central position in the olefinic compound, in order to afford products which find greater uses in other reactions than do the original compounds.

Examples of hydroxy-substituted aromatic compounds which may undergo alkylation according to the process of this invention will include phenol; polyhydric phenols such as resorcinol, hydroquinone, catechol, pyrogallol, hydroxy-hydroquinone, monoalkyl mono-hydric phenols such as o-cresol, m-cresol, p-cresol, o-ethylphenol, m-ethylphenol, p-ethylphenol o-propylphenol, m-propylphenol, p-propylphenol; polyalkyl mono-hydric phenols such as 2,3-dimethylphenol, 2,4-dimethylphenol, 3,5-dimethylphenol, 2,3-diethylphenol, 2,4-diethylphenol, 3,5-diethylphenol, etc.

It is also contemplated within the scope of this invention that the term "hydroxy-substituted aromatic compounds" as used in the present specification and appended claims will also refer to compounds in which the oxygen atom is replaced by a sulfur atom. Thus, compounds such as thiophenol, monoalkyl thiophenols such as o-thiocresol, m-thiocresol, and p-thiocresol, m-ethylthiophenol, o-ethylthiophenol, p-ethylthiophenol, etc., will fall within the definition and may also undergo alkylation when utilizing the novel catalyst complex of the present invention. It is to be understood that the aforementioned hydroxy-substituted aromatic compounds are only representative of the class of compounds which may undergo alkylation and that the present invention is not necessarily limited thereto.

The alkylation agent which may be utilized as one of the starting materials of the process of this invention will include olefinic hydrocarbons such as ethylene, propylene, 1-butene, 2-butene, 1-pentene, 2-pentene, 1-hexene, 2-hexene, 3-hexene, the isomeric straight chain olefins containing from 7 carbon atoms up to about 20 carbon atoms including the heptenes, nonenes, decenes, undecenes, dodecenes, tridecenes, tetradecenes, pentadecenes, hexadecenes, heptadecenes, octadecenes, nonadecenes, eicosenes, etc., as well as branched chain isomers thereof. In addition, it is also contemplated within the scope of this invention that low molecular weight carbohydrates may also be used to effect the alkylation of hydroxy-substituted aromatic compounds, although not necessarily with equivalent results. Examples of carbohydrates that may be utilized as alkylating agents for the aromatic compounds include aldohexoses, and their di-, tri- and poly forms. Simple aldohexoses which may be used include manose, glucose, idose, gulose, galactose, talose, allose, and altrose. Utilizable aldohexose disaccharides which may be used include turanose, maltose, lactose, trehalose, etc. Various poly saccharides which yield aldohexoses during the reaction are also utilizable and will include starch, cellulose, dextran, etc.

The catalyst composition of the present invention comprises a hydrogen fluoride-carbon dioxide complex, said complex being formed due to the fact that hydrogen fluoride is miscible with the carbon dioxide. The hydrogen fluoride may be present in the catalyst complex in a range of from about 0.1 to about 95 weight percent of catalyst complex. In addition to the miscibility of the hydrogen fluoride with the carbon dioxide, in some instances it has been found that the reactant which is to undergo alkylation, isomerization, etc., may also be miscible with the carbon dioxide and thus a single phase may be used to effect the reaction. By utilizing this single phase, it is possible that a sizable reduction in the catalyst-reactant ratio may be effected as well as being able to utilize shorter contact times.

It is contemplated within the scope of this invention that the organic reactions which are to be effected utilizing the hydrogen fluoride-carbon dioxide complex may be effected at temperatures ranging from about −20° C. up to about 150° C. and at pressures within the range of from about 10 to about 2,000 pounds per square inch, the most important consideration being that the reaction be effected under optimum conditions so that the maximum amount of hydrogen fluoride is miscible with the carbon dioxide in the liquid phase.

The process of this invention may be effected in any suitable manner and may comprise either a batch or continuous type operation. For example, when a batch type operation is used, a quantity of the hydroxy-substituted aromatic hydrocarbon which is to be reacted is placed in an appropriate apparatus such as, for example, a stirred or rotated autoclave which contains the catalyst system comprising a hydrogen fluoride-carbon dioxide complex. If, for example, the organic reaction which is to be effected is an alkylation reaction, the alkylating agent is thereafter charged to the reactor which is maintained at the proper operating conditions of temperature and pressure for a predetermined residence time. At the end of this time, the reactor and contents thereof are allowed to return to room temperature and atmospheric pressure. At this point, when the vessel is returned to atmospheric pressure, the carbon dioxide and an appreciable amount of hydrogen fluoride will leave the reactor. The vessel is opened and the reaction mixture is separated from the remainder of the hydrogen fluoride in the catalyst system by conventional means and thereafter subjected to separation means such as fractional distillation, crystallization, etc., whereby the desired product which contains the modification of the products which are usually obtained with conventional catalysts is recovered.

It is also contemplated within the scope of this invention that the process may be effected in a continual manner of operation. When such a type of operation is used, a quantity of the hydroxy-substituted aromatic hydrocarbon and alkylating agents is continuously charged to the reaction zone which is maintained at the proper operating conditions of temperature and pressure. In addition, the catalyst complex is also continuously charged to the reaction zone through separate means. It is contemplated that the catalyst system may be prepared prior to entry into said reactor and charged thereto as a hydrogen fluoride-carbon dioxide complex, or the hydrogen fluoride and carbon dioxide may be charged to the reactor through separate means and admixed therein to form the catalyst complex in situ. Upon completion of the desired residence time, the reactor effluent is continuously withdrawn, the unreacted starting materials and catalyst complex are separated from the effluent and the latter is then subjected to fractionation means whereby the desired product is recovered.

The following examples are given to illustrate the process of the present invention which, however, are not intended to limit the generally broad scope of the present invention in strict accordance therewith.

EXAMPLE I

In this example 4 moles of phenol and 12 moles of hydrogen fluoride are placed in a turbomixer autoclave. Following this, carbon dioxide is pressured into the reactor until the carbon dioxide content of the catalyst phase reaches 28 weight percent. Thereafter, 1 mole of propylene is charged to the autoclave which is maintained at a temperature of approximately 0° C. by means of an ice bath while maintaining the mixture in a stirred condition. At the end of 2.5 hours, the autoclave is allowed to return to room temperature during which time the excess pressure is released and thereafter the autoclave is purged of the residual hydrogen fluoride by using a stream of nitrogen as the purging agent for a period of 2 hours. The autoclave is opened, the reaction mixture is transferred to a beaker containing ice and water and the autoclave is washed using a pentane solvent. The gleanings are combined with the bulk product and the hydrocarbon layer is separated from the dilute aqueous catalyst phase. The residual hydrogen fluoride is neutralized by the addition of calcium carbonate, the mixture is filtered and subjected to fractional distillation to remove the pentane solvent and most of the unreacted phenol. The bottoms are then subjected to distillation whereby the desired product comprising isopropylphenols is recovered.

A repeat of this experiment utilizing a catalyst comprising only hydrogen fluoride in a greater amount than that which is present in the hydrogen fluoride-carbon dioxide complex will result in a decrease yield of isopropylphenols, more diisopropylphenols being present.

EXAMPLE II

A mixture of 4 moles of phenol and 12 moles of hydrogen fluoride is placed in a turbomixer autoclave. Carbon dioxide is then pressured in until the carbon dioxide content of the catalyst phase reaches approximately 30 weight percent. Thereafter, 1 mole of isobutene is charged to the reactor and the reaction allowed to proceed for a period of about 3 hours with continuous stirring while maintaining the temperature of the autoclave at approximately 5° C. by means of an ice bath. At the end of the reaction period, the autoclave is allowed to warm to room temperature during which time the excess pressure is released. Thereafter the autoclave is purged of residual hydrogen fluoride by passing a stream of nitrogen through the autoclave for a period of 2 hours. The autoclave is then opened and the reaction product is recovered by decantation into a copper beaker containing ice and water. After washing the autoclave with a pentane solvent which is added to the bulk product, the hydrocarbon layer is separated from the aqueous catalyst layer and neutralized by the addition of calcium carbonate. The mixture is then filtered and subjected to distillation to remove the solvent and unreacted phenol. Further distillation will result in the recovery of the desired product comprising a mixture of isomeric t-butylphenols A repeat of this experiment utilizing a catalyst comprising 25 moles of hydrogen fluoride with no added carbon dioxide will result in the formation of a lesser amount of the t-butylphenols.

EXAMPLE III

In this example, a mixture of m-cresol and hydrogen fluoride is placed in a turbomixer autoclave and treated in a manner similar to that set forth in the above examples, that is, by charging carbon dioxide and isobutene to the sealed autoclave. After passage of a residence time of 3 hours with continuous stirring while maintaining the autoclave at the reaction temperature of 5° C., the autoclave is allowed to return to room temperature while releasing the excess pressure. Thereafter the residual hydrogen fluoride is purged with nitrogen and the product is recovered. Treatment of the product in a manner similar to that set forth above will result in the obtention of the desired product comprising t-butyl-m-cresol.

A repeat of this example utilizing only hydrogen fluoride as an alkylation catalyst with no carbon dioxide present will result in obtaining a lower yield of the butylated m-cresol.

EXAMPLE IV

A mixture of 4 moles of phenol, 1 mole of dodecene-1, and 12 moles of hydrogen fluoride is placed in a turbomixer autoclave. The autoclave is maintained at a temperature of 5° C. by means of an ice bath with continuous stirring while carbon dioxide is pressured until a carbon dioxide content of 25 weight percent of the catalyst phase has been reached. At the end of 3 hours, the autoclave is allowed to return to room temperature, the excess pressure is vented and a stream of nitrogen is passed through the apparatus for a period of 2 hours to purge the apparatus of hydrogen fluoride. The autoclave is then opened and the bulk product is removed therefrom into a copper beaker containing ice and water. Following, a pentane solvent is used to scavenge the autoclave and the gleanings of the wash are combined with the bulk product. The organic layer is then separated from the aqueous catalyst layer, neutralized with calcium carbonate to remove traces of residual hydrogen fluoride and is subjected to fractional distillation steps whereby the desired product comprising a mixture of isomeric dodecylphenols is recovered.

When repeating the alkylation of phenol with dodecene-1 utilizing a catalyst system which contains only 21 moles of hydrogen fluoride rather than the complex of the present invention, it is found that the yield of the desired dodecylphenols is less than that which is obtained when utilizing the hydrogen fluoride-carbon dioxide complex, the product being contaminated by a presence of a greater amount of didodecylphenols.

EXAMPLE V

In this example a mixture of 4 moles of hydroquinone and 10 moles of hydrogen fluoride is treated by placing the mixture in a turbomixer autoclave which is maintained at a temperature of about 5° C. by means of an ice bath. Carbon dioxide is then pressured in until an amount equal to that of about 30 weight percent of the catalyst phase is added. Thereafter isobutene is charged to the turbomixer until 1 mole of the olefin is charged. After a contact time of 3 hours has passed, the turbomixer is allowed to return to room temperature, the excess pressure is released and the residual hydrogen fluoride is purged with a stream of nitrogen for a period of 2 hours. The autoclave is opened and the reaction product is treated in a manner similar to that set forth. After filtration, the solvent and unreacted hydroquinone are removed by distillation and the desired t-butylhydroquinone is recovered. It is found when repeating the above experiment utilizing only hydrogen fluoride as a catalyst for the alkylation reaction rather than a catalyst comprising a hydrogen fluoride-carbon dioxide complex, that a lesser amount of t-butylhydroquinone will be formed.

I claim as my invention:

1. In a process for the liquid phase alkylation of a hydroxy-substituted aromatic compound by condensing said compound with an aliphatic mono-olefinic hydrocarbon of from 2 to 20 carbon atoms at a temperature in the range of from about −20° to about 150° C. and a pressure in the range of from about 10 to about 2,000 pounds per square inch, said aromatic compound being selected from the group consisting of phenol, poly-hydric phenols, monoalkyl mono-hydric phenols and polyalkyl mono-hydric phenols each of said alkyls containing from 1 to 3 carbon atoms, the improvement which comprises effecting the condensation of said aromatic compound and hydrocarbon in the presence of a hydrogen fluoride-carbon dioxide complex consisting essentially of carbon dioxide and from about 0.1 about 95 weight percent hydrogen fluoride.

2. The process as set forth in claim 1 in which said hydroxy-substituted aromatic compound is phenol, said olefinic hydrocarbon is propylene, and the alkylated hydroxy-substituted aromatic compound is isopropylphenol.

3. The process as set forth in claim 1 in which said hydroxy-substituted aromatic compound is phenol, said olefinic hydrocarbon is isobutene, and the alkylated hydroxy-substituted aromatic compound is t-butylphenol.

4. The process as set forth in claim 1 in which said hydroxy-substituted aromatic compound is m-cresol, said olefinic hydrocarbon is isobutene, and the alkylated hydroxy-substituted aromatic compound is t-butyl-m-cresol.

5. The process as set forth in claim 1 in which said hydroxy-substituted aromatic compound is phenol, said olefinic hydrocarbon is dodecene-1, and the alkylated hydroxy-substituted aromatic compound is dodecylphenol.

6. The process as set forth in claim 1, in which said hydroxy-substituted aromatic compound is hydroquinone, said olefinic hydrocarbon is isobutene, and the alkylated hydroxy-substituted aromatic compound is t-butylhydroquinone.

* * * * *